United States Patent [19]

Barenyi et al.

[11] 3,797,601
[45] Mar. 19, 1974

[54] SAFETY STEERING FOR MOTOR VEHICLES

[75] Inventors: Bela Barenyi, Maichingen; Hermann Renner, Magstadt, both of Germany

[73] Assignee: Daimler-Benz Aktiengesellschaft, Stuttgart-Untertuerkheim, Germany

[22] Filed: May 26, 1972

[21] Appl. No.: 257,099

[30] Foreign Application Priority Data
May 28, 1971  Germany............................ 2126666
May 28, 1971  Germany............................ 2126668

[52] U.S. Cl................ 180/78, 180/82, 180/90, 296/70
[51] Int. Cl. ... B60k 27/00, B60r 19/00, B60k 37/00
[58] Field of Search............ 180/78, 82 R, 82 E, 90; 296/70, 39 R, 39 A

[56] References Cited
UNITED STATES PATENTS

| | | | |
|---|---|---|---|
| 3,498,402 | 3/1970 | Barenyi | 180/90 |
| 3,341,248 | 9/1967 | Barenyi et al. | 180/90 UX |
| 3,470,761 | 10/1969 | Okamoto et al. | 180/78 X |
| 3,042,137 | 7/1962 | Mathues et al. | 180/90 |
| 3,434,367 | 3/1969 | Renneker et al. | 180/82 R X |
| 3,435,701 | 4/1969 | Bucher | 180/78 X |
| 3,457,800 | 7/1969 | Toshida et al. | 180/78 X |
| 3,461,740 | 8/1969 | Tajima et al. | 180/78 X |
| 3,492,888 | 2/1970 | Nishimura et al. | 180/78 X |
| 3,495,474 | 2/1970 | Nishimura et al. | 180/82 R X |
| 3,613,476 | 10/1971 | Cunningham | 180/78 X |

FOREIGN PATENTS OR APPLICATIONS

| | | | |
|---|---|---|---|
| 1,399,426 | 4/1965 | France | 180/90 |
| 1,431,428 | 1/1966 | France | 180/90 |
| 834,651 | 3/1952 | Germany | 180/90 |
| 1,023,920 | 3/1966 | Great Britain | 180/90 |
| 1,196,187 | 6/1970 | Great Britain | 180/78 |
| 577,525 | 6/1958 | Italy | 180/90 |

*Primary Examiner*—Robert S. Ward, Jr.
*Attorney, Agent, or Firm*—Craig and Antonelli

[57] ABSTRACT

A safety steering arrangement for motor vehicles with a plastically deformable structural part arranged between a steering hand wheel and the front wall of the vehicle; the steering wheel is thereby rotatably supported in the end of the plastically deformable structural part facing the passenger space while the steering movements are transmitted from the hand wheel to a steering gear by way of an intermediate member which is relatively stiff in torsion yet yielding in the deformation direction of the plastically deformable part.

27 Claims, 9 Drawing Figures

PATENTED MAR 19 1974

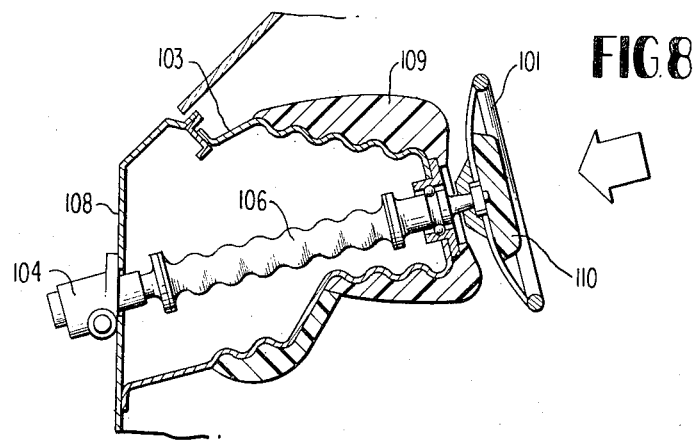
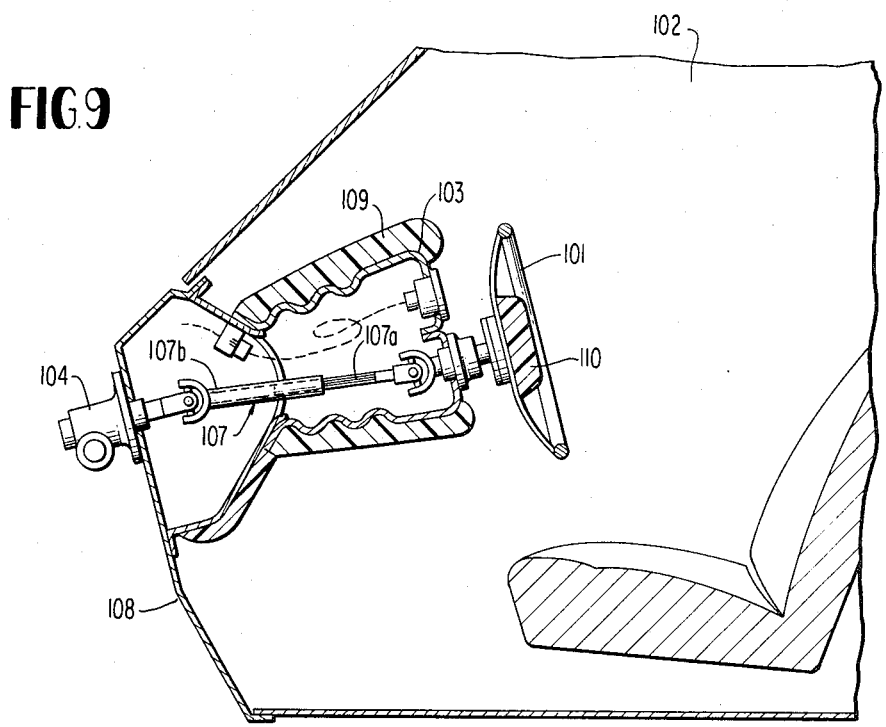

SAFETY STEERING FOR MOTOR VEHICLES

The present invention relates to a safety steering arrangement for motor vehicles with a pot-shaped deformation member arranged between a steering hand wheel and the front wall. More particularly, the present invention also relates to a safety steering device for motor vehicles in which the steering wheel is so arranged at a plastically deformable structural part that in case of an impact of the driver against the steering wheel caused by an accident, it is able to deflect whereby the plastically deformable structural part absorbs at least a portion of the impact energy.

Deformation members arranged between the steering wheel and the upper end of the steering spindle which are also referred to as so-called impact pots, have proved as the most effective, as the most simple and also as the most inexpensive measure for the reduction of the accident consequences.

Such types of deformation members offer to the driver in the shape as they are presently installed in practice in motor vehicles, a survival chance up to an impact velocity of 50 km/h.

In the prior art arrangements, such deformation members, i.e., such impact pots, are normally arranged between the steering hand wheel and the steering spindle and transmit the steering wheel movements to the steering spindle. By reason of the required torsional rigidity, limitations are imposed on the length of these deformation members. Therebeyond, such prior art arrangements require a coaxial support of steering spindle, impact pot, and steering hand wheel. Furthermore, a slight unilateral deformation of the impact pot, as can readily occur in practical operation, has as a consequence a wobbling of the steering hand wheel.

The present invention is therefore concerned with the task to provide a steering arrangement which, with a constructively simple design, assures a high rigidity and stiffness during the normal usage, which absorbs the energy of an impinging body in case of an accident over a long deformation path, which adapts itself to the plane of the impinging body and which eliminates further disadvantages of the prior art arrangements.

As solution to the underlying problem, a safety steering is therefore proposed for motor vehicles with a pot-shaped deformation member arranged between the steering hand wheel and the front wall, in which according to the present invention, the deformation member is connected with the front wall or a front wall bearer and in which the steering wheel is rotatably supported at the end of the deformation member facing the passenger space, and whereby the steering torque is transmitted from the steering hand wheel to a steering gear by way of an intermediate member which is stiff against torsion and yielding in the deformation direction of the deformation member.

A flexible shaft, a joint-shaft with a sliding element, a corrugated tube or the like may be used as intermediate member.

According to one preferred embodiment of the present invention, control, indicating and/or actuating devices are arranged on the inside of the deformation member and a portion of the casing of the deformation member is constructed as cover adapted to be pivoted open or adapted to be removed in order to enable a good accessibility to the parts arranged on the inside of the deformation member.

Furthermore, definite limitations are imposed in the prior art on an increase of the possible deformation path as well as on the attainment of a differentiated yieldingness in different impact directions by reason of the vibrational strength and the requirements for an absolutely concentric motion of the steering wheel which can be impaired by relatively minor deformations of the deformation member as always occur in practice.

Accordingly, the present invention is also concerned with the task to enable in a safety steering system for motor vehicles an extremely large deformation path of the parts adjoining the steering wheel without having to accept thereby the disadvantages described above.

The problems thereof are solved in a safety steering arrangement of the aforementioned type in that according to the present invention, the steering wheel is supported exclusively at a front wall part which faces the passenger space and is plastically deformably constructed in a conventional manner, and in that the steering torque is transmitted to the steering gear or the like by way of an intermediate member which is stiff against torsion and yielding in the deformation direction of the intermediate member.

According to a preferred embodiment of the present invention, the plastically deformable front wall extends over the entire width of the passenger space.

Furthermore, it is particularly advantageous if, for the purpose of influencing the plastic deformation of the front wall portion, stiffening corrugations, steps, arcs, curved portions, apertures or the like are provided at or in the same.

The securing of the plastically deformable front wall portion takes place preferably detachably or non-detachably at the front section of the vehicle—for example, by flanges.

Accordingly, it is an object of the present invention to provide a safety steering system for motor vehicles which avoids by simple means the aforementioned shortcomings and drawbacks encountered in the prior art.

Another object of the present invention resides in a safety steering system for motor vehicles which assures a completely concentric motion of the steering wheel notwithstanding slight deformations of the impact pot as may occur in operation.

A further object of the present invention resides in a steering arrangement which is constructively simple, possesses a high rigidity during normal operation and absorbs the impact energy produced by an accident along a relatively long deformation path.

Still a further object of the present invention resides in a safety steering arrangement of the type described above which can be used effectively for accommodating control, indicating and actuating devices within the deformation member while simultaneously assuring good access to the same.

Another object of the present invention resides in a safety steering arrangement for motor vehicles which effectively produces a large deformation path of the parts adjoining the steering wheel without having to accept the disadvantages of the prior art constructions.

These and other objects, features and advantages of the present invention will become more apparent from the following description when taken in connection with the accompanying drawing which shows, for purposes of illustration only, several embodiments in accordance with the present invention, and wherein:

FIGS. 7-9 are somewhat schematic longitudinal cross-sectional views through three further modified embodiments of a safety steering arrangement in accordance with the present invention, shown in the manner similar to FIG. 1.

Figure 1:
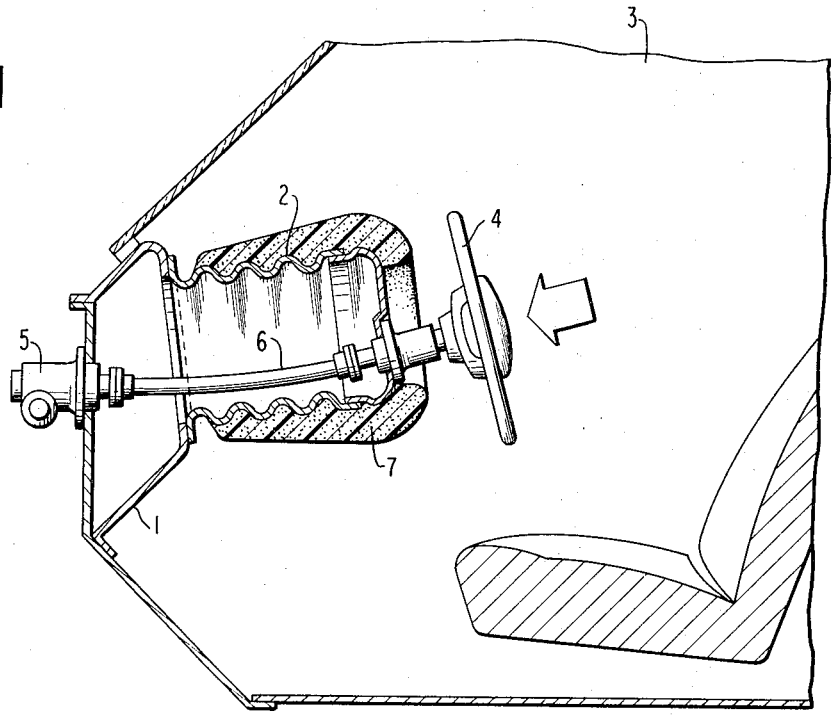
FIG. 1 is a somewhat schematic longitudinal cross-sectional view through one embodiment of a safety steering arrangement in accordance with the present invention taken through the deformation member and the intermediate member transmitting the steering moment.

Referring now to the drawing wherein like reference numerals are used throughout the various views to designate like parts, and more particularly to FIG. 1, in the embodiment of the present invention illustrated in this figure, a deformation member 2 provided with an undulated casing is secured at the front wall 1 of the passenger motor vehicle, illustrated only in part; the steering wheel 4 is rotatably supported at the end of the deformation member 2 facing the passenger space 3. A flexible shaft 6 serves for the transmission of the steering torque from the steering hand wheel 4 to the steering gear 5. The surface of the deformation member 2 is covered by a thick-walled padding 7 of any conventional type.

Figure 2:
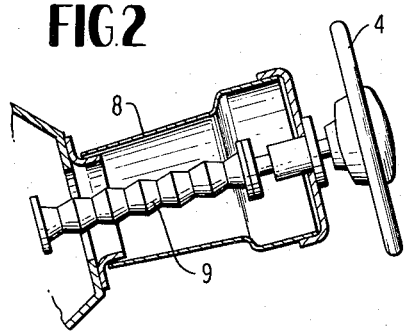
FIGS. 2-4 are partial schematic longitudinal cross-sectional views through three further modified embodiments of a safety steering arrangement in accordance with the present invention.

In the embodiment according to FIG. 2, a deformation member 8 provided with a step is used, and the transmission of the steering movements from the steering wheel 4 to the steering gear (not shown) takes place by way of an undulated tube.

Figure 3:
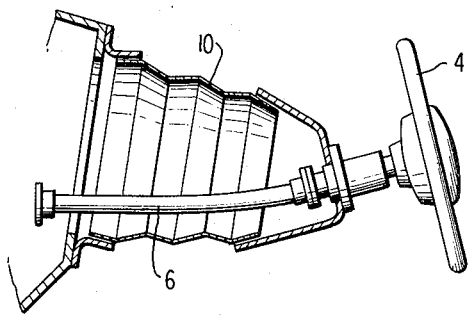

In the embodiment according to FIG. 3, a deformation member 10 is illustrated which is offset several times; the steering hand wheel 4 is so supported at the deformation member 10 that its axis of rotation—as is also the case in FIG. 1—does not coincide with the center longitudinal axis of the deformation member 10.

Figure 4:
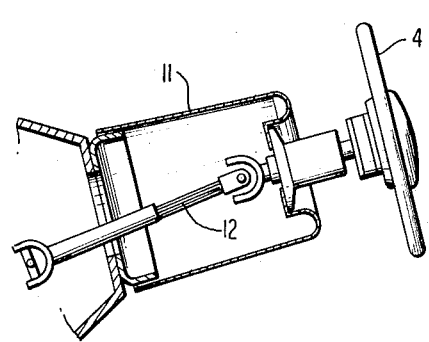

In FIG. 4, a smooth-walled deformation member 11 is illustrated, on which the steering wheel 4 is so supported that in case of an impact of a person against the steering hand wheel 4, an inverting of the deformation member 11 occurs. A joint-shaft 12 provided with a sliding member of any conventional type thereby serves for the transmission of the steering torque.

Figure 5:
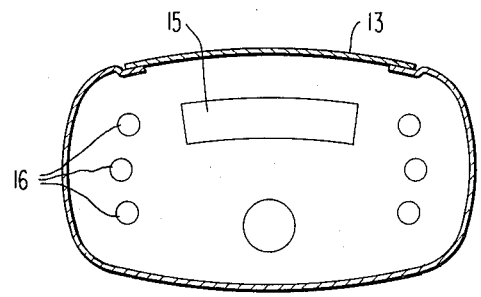
FIGS. 5 and 6 are plan views on the end facing the passenger space of two deformation members in accordance with the present invention.
Figure 6:
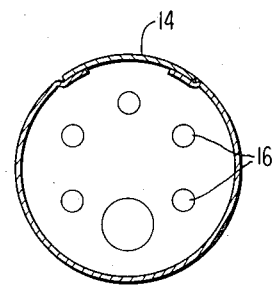

A view on the top surface facing the steering wheel of a deformation member is illustrated in each of FIGS. 5 and 6, whereby the deformation member illustrated in FIG. 5 has an oval cross section and the deformation member illustrated in FIG. 6 is a circular cross section. A portion of the top surface of the casing of these deformation members is thereby constructed as removable cover or lid 13 or 14 in order to enable, for example, an unimpaired access to instruments which can be inserted into the apertures 15 and bores 16 illustrated in the drawing.

Figure 7:
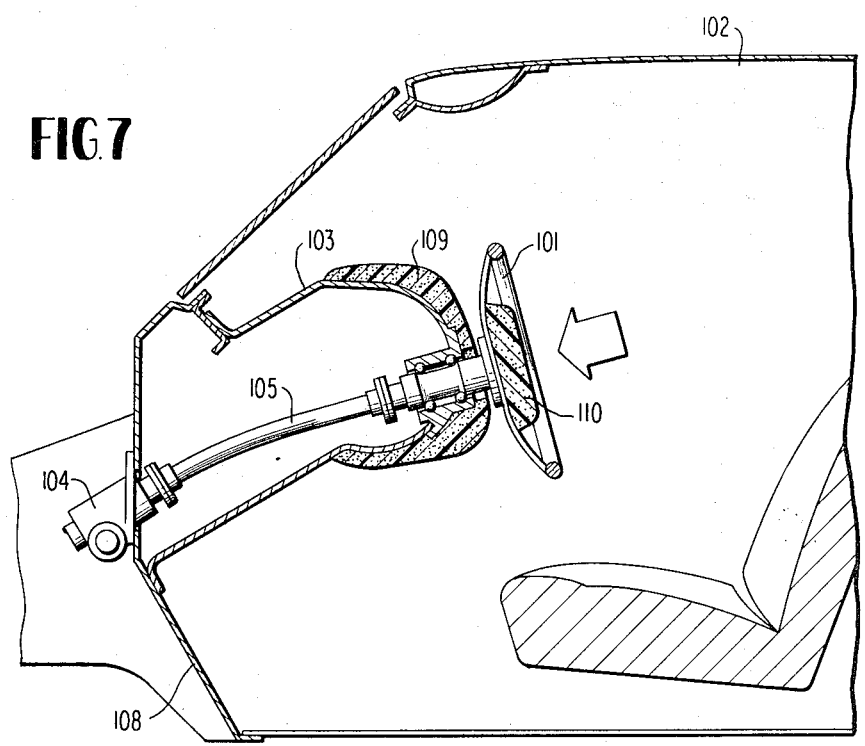

In the embodiments illustrated in FIGS. 7-9 of the present invention, the steering wheel 101 is again rotatably supported on a plastically deformable member which in this case is a plastically deformable front wall part 103 facing the passenger space 102 of the vehicle. The transmission of the steering movements to the steering gear 104 thereby takes place by way of an intermediate member rigid against torsion but yielding in the deformation direction of the front wall portion 103. A flexible shaft 105 is used as intermediate member in the embodiment of FIG. 7, an undulated tube 106 in the embodiment according to FIG. 8 and a joint-shaft generally designated by reference numeral 107 in the embodiment of FIG. 9, which includes telescoping parts 107a and 107b.

The main direction, in which the driver of the vehicle would impinge against the steering wheel in case of an accident, is indicated in the illustrated embodiments of FIGS. 7-9 by an arrow each.

In all three embodiments of FIGS. 7-9, the plastically deformable front wall portion 103 is connected in any suitable manner with the front end structure 108 of the vehicle, for example, by flanges, either detachably or non-detachably.

For the further increase of the internal safety of the vehicle, the front wall portion 103 is provided in each case with a thick-walled padding 109, preferably consisting of suitable foamed material of any conventional type, and an impact plate 110 is arranged on the inside of the steering wheel ring which is also padded and has as large as possible a surface.

The shape and configuration of the illustrated front wall portion 103 is so selected with the aid of undulations, corrugations, steps, apertures, etc. that in case of an impact of the driver against the steering wheel, an aimed-at deformation of the front wall portion 103 can take place.

It may be stated quite generally that the deformation member which is to be connected preferably detachably with the front wall, may be in transverse cross section, for example, circular, eliptical, or oval and in longitudinal cross section, for example, cylindrical or conically tapering toward the front or toward the rear, and that finally the respective base shape may be, for example, undulated, toothed, offset or stepped and therewith can be matched to all practical requirements.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety steering arrangement for motor vehicles comprising
    a plastically deformable deformation member secured to a relatively fixed part of a vehicle and extending into a passenger space of the vehicle, said deformation member having a surface portion forming a front wall means facing the passenger space of said vehicle;
    a steering wheel means rotatably supported only at said front wall means of said deformation member; and
    an intermediate drive means for transmitting steering torques from said steering wheel means to a steering gear means, and intermediate drive means being relatively rigid against torsion and yielding against impact forces in the deformation direction of said front wall means.

2. A safety steering arrangement according to claim 1, characterized in that the relatively fixed vehicle part is a front wall structure.

3. A safety steering arrangement according to claim 2, characterized in that the deformation means is connected with a front wall bearer of the front wall structure.

4. A safety steering arrangement according to claim 1, characterized in that auxiliary devices are arranged on the inside of the deformation means.

5. A safety steering arrangement according to claim 4, characterized in that said auxiliary means include control, indicating or actuating devices.

6. A safety steering arrangement according to claim 4, characterized in that the deformation means includes a casing, and in that a portion of the casing of the deformation means is constructed as cover means adapted to be opened.

7. A safety steering arrangement according to claim 6, characterized in that said cover means is adapted to be pivoted open.

8. A safety steering arrangement according to claim 6, characterized in that the cover means is adapted to be removed.

9. A safety steering arrangement according to claim 6, characterized in that the surface of the deformation means is covered with a padding means consisting of foamed material.

10. A safety steering arrangement according to claim 9, characterized in that said deformation means is a pot-shaped deformation member arranged between the steering wheel and the front wall structure.

11. A safety steering arrangement according to claim 1, characterized in that said deformation means is a pot-shaped deformation member arranged between the steering wheel and the relatively fixed part of said vehicle.

12. A safety steering arrangement according to claim 11, characterized in that the relatively fixed vehicle part is a front wall structure.

13. A safety steering arrangement according to claim 11, characterized in that auxiliary devices are arranged on the inside of the deformation means.

14. A safety steering arrangement according to claim 13, characterized in that the deformation means includes a casing, and in that a portion of the casing of the deformation means is constructed as cover means adapted to be opened.

15. A safety steering arrangement according to claim 11, characterized in that the surface of the deformation means is covered with a padding means consisting of foamed material.

16. A safety steering arrangement according to claim 1, characterized in that the plastically deformable front wall means extends substantially over the entire width of the passenger space.

17. A safety steering arrangement according to claim 16, characterized in that means are provided in the plastically deformable means for influencing the deformation thereof.

18. A safety steering arrangement according to claim 17, characterized in that said last-mentioned means consist of corrugations, steps, arcs, apertures or the like.

19. A safety steering system according to claim 17, characterized in that the plastically deformable front wall portion is connected with the front end section structure of the motor vehicle forming said relatively fixed part.

20. A safety steering system according to claim 19, characterized in that the plastically deformable front wall portion is connected at the front end section structure by way of flange means.

21. A safety steering arrangement according to claim 1, wherein said intermediate drive means is a flexible shaft.

22. A safety steering arrangement according to claim 1, wherein said intermediate drive means is an undulated tube.

23. A safety steering arrangement according to claim 1, wherein said intermediate drive means is a joint-shaft provided with an axially sliding member.

24. A safety steering arrangement for motor vehicles in which a steering wheel is so arranged at a plastically deformable structural part that it is able to deflect in case of an impact of the driver against the steering wheel caused by an accident, whereby the plastically deformable structural part absorbs at least a portion of the impact energy, characterized in that the steering wheel is supported exclusively at a plastically deformable front wall means facing the passenger space and forming the plastically deformable structural part, and in that the steering torque is transmitted from the steering wheel to a steering gear by way of an intermediate means which is stiff against torsion and yielding in the deformation direction of the front wall means.

25. A safety steering arrangement according to claim 24, characterized in that the plastically deformable front wall means extends over the entire width of the passenger space.

26. A safety steering arrangement according to claim 24, further comprising means for influencing the plastic deformation of the front wall means.

27. A safety steering arrangement according to claim 24, characterized in that the plastically deformable front wall means is connected with a fixed part of the vehicle front-end section.

* * * * *